United States Patent [19]

Tsukamoto

[11] Patent Number: 4,544,252
[45] Date of Patent: Oct. 1, 1985

[54] APPARATUS FOR DISPLAYING INFORMATION IN CAMERA VIEW FINDER

[75] Inventor: Masaaki Tsukamoto, Kawasaki, Japan

[73] Assignee: Nippon Kogaku K.K., Tokyo, Japan

[21] Appl. No.: 585,247

[22] Filed: Mar. 1, 1984

[30] Foreign Application Priority Data

Mar. 8, 1983 [JP] Japan ............................. 58-33404[U]

[51] Int. Cl.[4] ...................... G03B 17/20; G01D 11/28
[52] U.S. Cl. .................................... 354/289.1; 362/29
[58] Field of Search ............... 354/471, 475, 472, 474, 354/155, 219, 224, 225, 289.1, 289.12; 362/23, 29, 30, 237, 259, 800

[56] References Cited

U.S. PATENT DOCUMENTS

| 4,165,167 | 8/1979 | Jurenz et al. ....................... 354/471 |
| 4,185,891 | 1/1980 | Kaestner ............................ 362/800 |
| 4,265,522 | 5/1981 | Matsumoto et al. ........... 354/474 X |

FOREIGN PATENT DOCUMENTS

| 197705 | 5/1978 | Fed. Rep. of Germany ...... 354/289 |
| 130828 | 8/1982 | Japan ................................... 354/474 |

Primary Examiner—William B. Perkey
Attorney, Agent, or Firm—Fitzpatrick, Cella, Harper & Scinto

[57] ABSTRACT

An apparatus for displaying camera information in the view finder of a camera is provided with a sheet-like display member having plural display portions on which reference characters indicative of the camera information are depicted, respectively. A light emission array is disposed opposed to and spaced away from the display member. Each of plural light emission elements of the light emission array corresponds to the respective one of the display portions on the display member. The space between the light emission array and the display member is divided into plural regions each of which contains the light emission element and the corresponding display portion, so that any transmission of light between each adjacent region is prevented. The light from each of the light emission elements is condensed by a light condensing device and is projected toward the corresponding display portion through a light diffusion device disposed between the light condensing device and the display member.

5 Claims, 9 Drawing Figures

APPARATUS FOR DISPLAYING INFORMATION IN CAMERA VIEW FINDER

BACKGROUND OF THE INVENTION

1. Field of the Invention

The present invention relates to an apparatus for displaying information in the view finder of a camera, and particularly to such an apparatus having a plurality of light emission elements for displaying information at a plurality of adjacent positions.

2. Description of Prior Art

There is known a camera having a view finder in which various data of information are display by the use of miniature and durable light emission elements such as light emission diodes. The information displayed in the view finder include various reference characters such as shutter speeds, diaphragm openings, marks for indicating various conditions of exposure, and others which are often displayed at very adjacent locations in the view finder because the reference characters are displayed on the narrow peripheral areas of the view finder out of its visual field. Therefore, the light emission elements for illuminating these adjacent reference characters also are located at very adjacent positions. One of the adjacent light emission elements may illuminate and visualize any other reference character that should be illuminated by any other adjacent light emission element. This results in mis-discrimination or confusion with respect to the displayed information. Means for restricting the illuminatable area of a light emission element to overcome the above problem is disclosed, for example, in Japanese Laid-open Utility Model Application No. 57-130828.

This laid-open application describes an apparatus for displaying information in the view finder of a camera, in which each of light emission diodes is surrounded by a light blocking frame so that only the corresponding reference character on a display film can be illuminated by that light emission diode through a light diffusion tape. Thus, the illuminatable area of the light emission diode can be limited by the light blocking frame so that any other reference character to be illuminated by the other adjacent light emission diode will not be illuminated by the subject light emission diode.

If the light from each of the light emission diodes is diffused by the light diffusion tape so that the reference character will uniformly be illuminated by that light, however, the reference character will be illuminated with very reduced efficiency. Thus, the illuminated reference character will be dark and hard to observe. On the contrary, if the light emission diode is energized with increased power to increase the illuminance for that reference character, the power supply will more be consumed leading to increase of the power supply capacity. This is a severe problem for portable cameras which utilize small-sized batteries.

SUMMARY OF THE INVENTION

It is an object of the present invention to overcome the above problems in the prior art and to provide a finder display system which can display information with more illuminance in the view finder of a camera and without any increase of power consumption.

DETAILED DESCRIPTION OF PREFERRED EMBODIMENTS

Figure 1:
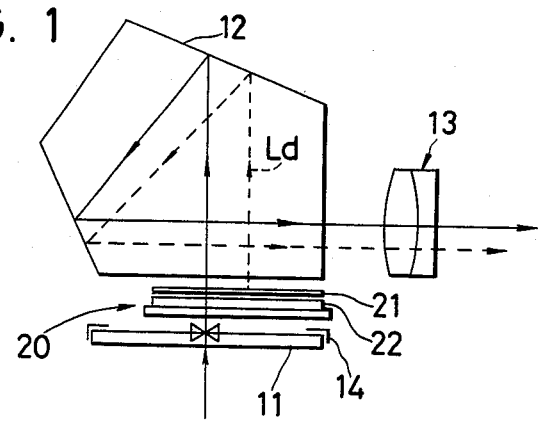
FIG. 1 is a schematic view of the view finder in a single-lens reflex camera into which one embodiment of the present invention is incorporated.

Referring to FIG. 1, there is shown a finder optical system in a single-lens reflex camera. An imaging beam passed through a camera lens is reflected by a swingable mirror (not shown) toward a focus plate 11 whereat an object is imaged. The image can be observed through a pentagonal-roof prism 12 and an eyepiece 13.

Figure 2:
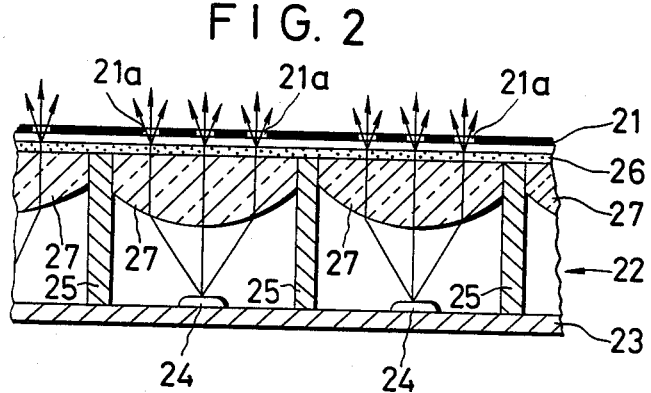
FIG. 2 is a fragmentary sectional view showing, in an enlarged scale, an information display member which is one embodiment of the present invention.

An information display member 20 is located between the focus plate 11 and the prism 12 at the peripheral frame area of a finder visual field frame 14. As shown in FIG. 2, the information display member 20 comprises a display film 21 and an illumination unit 22. The display film 21 may be a light blocking film having a plurality of light transmitting portions each of which defines a reference character or a light transmitting film having a plurality of light blocking portions.

The illumination unit 22 comprises a base plate 23 including a plurality of light emission elements 24 such as light emission diodes each of which corresponds to the respective one of plural reference characters 21a on the display film 21, a light blocking plate having partitions 25 disposed between each adjacent light emission element, a light diffusion member 26 located between the light blocking frame and the display film 21, and a condenser lens 27 located in each of frames defined by the partitions 25. Each of the condenser lenses 27 is adapted to deflect the light from the respective light emission element 24 to form a substantially collimated light beam which in turn irradiates a light diffusion member 26 in a uniform manner.

Figure 3:
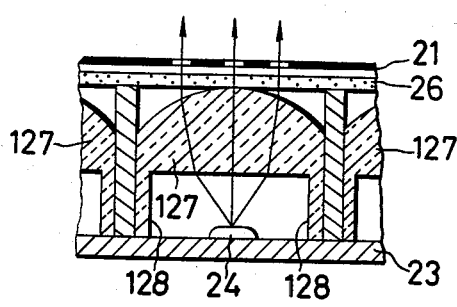
FIGS. 3 and 4 are fragmentary sectional views respectively showing, in the same enlarged scale, information display members which are other embodiments of the present invention.
Figure 4:
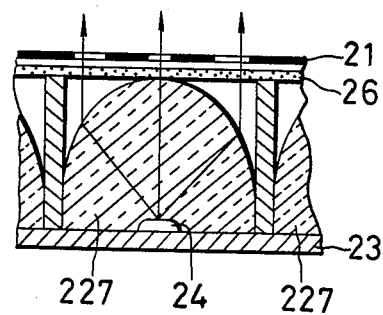

The condenser lens 27 is normally made of a transparent plastic material and is disposed near the backface of the light diffusion member 26 as shown in FIG. 2. If the condenser lens 27 is of plano-convex type, it may be formed integrally with the light diffusion member 26 at the plane face side of the lens. If the convex face of the condenser lens 27 faces the light diffusion member 26, the condenser lens may include a cylindrical portion 128 formed thereon at the side of the base plate 23 as shown by 127 in FIG. 3. The cylindrical portion 128 of the condenser lens 127 is adhered to and supported by the base plate 23. As shown in FIG. 4, furthermore, each of the light emission elements 24 is covered directly by the respective one of the condenser lenses 227. It is preferred that either of the condenser lens 27, 127 or 227 shown in FIGS. 2, 3 or 4 is of aspherical type.

Figure 5:
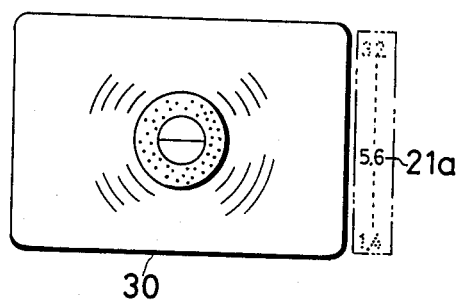
FIG. 5 is a plan view illustrating the visual field of a view finder.

FIG. 5 shows a visual field formed by the finder optical system. A taking field 30 is defined by the visual field frame 14 surrounded by the focus plate 11 of FIG. 1. In FIG. 5, information to be displayed (in this case, aperture value of 5.6) is displayed out of one side of the taking field 30 by a reference character 21a. This displayed information is obtained by illuminating that reference character 21a on the display film 21 only by the use of a light emission element 24 corresponding to the information to be displayed. After passing through that reference character 21a, the illumination beam Ld passes through the bottom face of the pentagonal-roof prism 12 and is then reflected by the inner side faces of the same prism 12 toward the eyepiece 13 along the optical path as shown by the broken line in FIG. 1. Thus, if the taking field 30 is observed by a person through the eyepiece 13, the reference character 21a also is observed adjacent the side of the taking field 30 as information.

Figure 6:
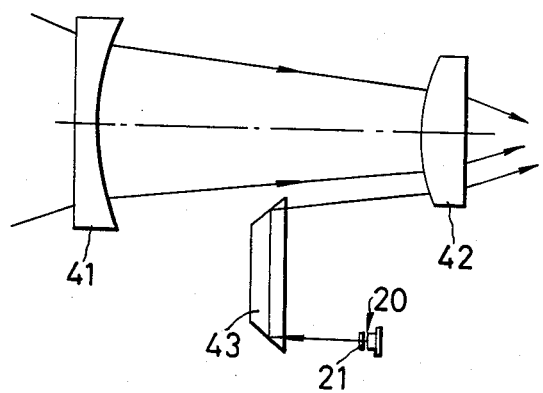
FIG. 6 is a schematic view of a further embodiment of the present invention which utilizes the Albada finder.

FIG. 6 shows a camera having Albada finder into which a display system according to the present invention is incorporated. Light from an object passes through a negative objective lens 41 and positive eyepiece 42 in the finder. Thus, the virtual image of the object may be observed through the eyepiece 42. On the other hand, light emitted from each of the light emission elements in the information display member 20 located adjacent the Albada finder optical system passes through the condenser lens, light diffusion member and display film 21 and thereafter is incident on the eyepiece 42 through a trapezoidal prism 43 which is located upstream of the eyepiece 42 and out of the optical path for observing the object. The display film 21 is located within the range through which the visual field of the person's eye observed through the eyepiece 42 can be adjusted. Therefore, any reference character on the display film can be observed by the person together with the object within the view finder.

If a taking condition is determined prior to taking the object, a light emission element 24 for illuminating a reference character 21a on the information display member 20 which corresponds to the determined taking condition will be controlled to emit a light. This light from the light emission element 24 is restricted by the partitions 25 with respect to its illuminatable range. The light is condensed to form a substantially collimated light beam by the respective condenser lens 27, 127 or 227 which is disposed within the corresponding frame defined by the partitions 25 and then conducted into the light diffusion member 26. Most of the beams slantingly emitted from the light emission elements 24 are deflected toward the light diffusion member 26 by means of the respective lenses 27, 127 or 227. Therefore, the amount of light to be projected onto the light diffusion member 26 is increased and made uniform.

Figure 7A:
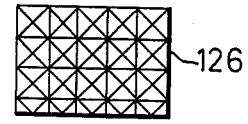
FIGS. 7A, 7B and 7C are plan views respectively showing modifications of the light diffusion member.
Figure 7B:
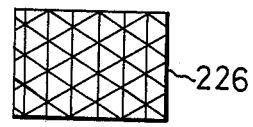
Figure 7C:
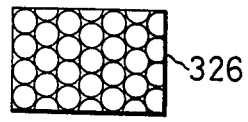

Since the condenser lens is provided to increase the amount of illumination light and to make the light uniform, the light diffusion member may be constructed in various different forms. For example, the light diffusion member may include a plurality of finely divided quadrangular pyramids, hexagonal pyramids or cones formed thereon at the surface, as shown by 126, 226 or 326 in FIGS. 7A to 7C. These configurations of the light diffusion member have less light diffusion. Even if such configurations of the light diffusion member are used in the apparatus according to the present invention, sufficient light can be transmitted to the eyepiece of the finder so that the information will be displayed uniformly with very increased illuminance. It is also preferred that the side and bottom faces of each of the partitions are coated with metallic film to form mirror surfaces thereon such that the light from each of the light emission elements will more effectively be transmitted forwardly.

I claim:

1. An apparatus for displaying camera information in the view finder of a camera, comprising:
(a) a sheet-like display member having a plurality of display portions on which reference characters indicative of said camera information are depicted, respectively;
(b) a light emission array including a plurality of light emission elements each corresponding to a respective one of said display portions on said display member, said light emission array being disposed opposed to and spaced away from said display member;
(c) light blocking means dividing the space between said light emission array and said display member into a plurality of regions each of which contains one of said light emission elements and one of said display portions, said light blocking means preventing said one display portion in each of said regions from being directly illuminated by light from the light emission elements in the adjacent regions;
(d) light condensing means disposed within each of said regions for condensing the light from each of said light emission elements and projecting it toward the corresponding display portion in said display member;
(e) light diffusion means located between said light condensing means and said display member and disposed substantially parallel with said display member; and
(f) said light condensing means including a plurality of plano-convex lens elements, each having an incident convex surface convex toward and opposed to said light emission array and an exit flat surface opposed to said light diffusion means, the exit flat surfaces being arranged on a fixed plane which is substantially parallel to said display member.

2. An apparatus as defined in claim 1, wherein said light diffusion means is disposed near said fixed plane.

3. An apparatus for displaying camera information in the view finder of a camera, comprising:
(a) a sheet-like display member having a plurality of display portions on which reference characters indicative of said camera information are depicted, respectively;
(b) a light emission array including a plurality of light emission elements each corresponding to a respective one of said display portions on said display member, said light emission array being disposed along a fixed plane opposed to and spaced away from said display member;
(c) light blocking means dividing the space between said light emission array and said display member into a plurality of regions each of which contains one of said light emission elements and one of said display portions, said light blocking means preventing said one display portion in each of said regions from being directly illuminated by light from the light emission elements disposed in the adjacent regions;
(d) light condensing means disposed within each of said regions for condensing the light from each of said light emission elements and projecting it toward the corresponding display portion in said display member;
(e) light diffusion means located between said light condensing means and said display member;
(f) said light condensing means including a plurality of plano-convex lens elements, each having an incident flat surface which is substantially coincident with said fixed plane and an exit convex surface convex toward and opposed to said light diffusion means, each incident flat surface being formed with a depression;
(g) said light emission elements being disposed in said depressions, respectively.

4. An apparatus as defined in claim 3 further comprising a base plate member having a surface corresponding to said fixed plane and supporting said light emission array thereon, and wherein said plano-convex lens elements are fixed to said surface of said base plate member.

5. An apparatus for displaying camera information in the view finder of a camera, comprising:
(a) a sheet-like display member having a plurality of display portions on which reference characters indicative of said camera information are depicted, respectively;
(b) a light emission array including a plurality of light emission elements each corresponding to a respective one of said display portions on said display member, said light emission array being disposed along a fixed plane opposed to and spaced away from said display member;
(c) light blocking means dividing the space between said light emission array and said display member into a plurality of regions each of which contains one of said light emission elements and one of said display portions, said light blocking means preventing said one display portion in each of said regions from being directly illuminated by light from the light emission elements disposed in the adjacent regions;
(d) light condensing means disposed within each of said regions for condensing the light from each of said light emission elements and projecting it toward the corresponding display portion in said display member;
(e) light diffusion means located between said light condensing means and said display member;
(f) a base plate member having a surface corresponding to said fixed plane and supporting said light emission array thereon;
(g) said light condensing means including plano-convex lens elements, each having an incident flat surface opposed to said base plate member, an exit convex surface convex toward and opposed to said light diffusion means and an annular projection projected toward said base plate member and having an end fixed to said surface of said base plate member;
(h) said light emission elements disposed, respectively, inside of the annular projections of said plano-convex lens elements.

* * * * *